United States Patent
Diao et al.

(10) Patent No.: US 8,140,673 B2
(45) Date of Patent: Mar. 20, 2012

(54) METHOD AND APPARATUS FOR CONTROLLING LOAD ADMISSION RATE OF AN APPLICATION SERVER

(75) Inventors: Yixin Diao, White Plains, NY (US);
Xiao Lei Hu, Beijing (CN); Michael Joseph Spreitzer, Croton-on-Hudson, NY (US); Asser Nasreldin Tantawi, Somers, NY (US); Rui Xiong Tian, Beijing (CN); Hai Shan Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 12/786,731

(22) Filed: May 25, 2010

(65) Prior Publication Data

US 2011/0295995 A1    Dec. 1, 2011

(51) Int. Cl.
*G06F 15/16* (2006.01)
*G06F 12/00* (2006.01)
(52) U.S. Cl. ........................ 709/224; 718/105
(58) Field of Classification Search .................. 709/203, 709/223–229, 250; 718/105
See application file for complete search history.

(56) References Cited

U.S. PATENT DOCUMENTS

| | | | | |
|---|---|---|---|---|
| 2006/0218279 | A1* | 9/2006 | Yamaguchi et al. | 709/226 |
| 2007/0143116 | A1* | 6/2007 | De Armas et al. | 704/270.1 |
| 2007/0233896 | A1* | 10/2007 | Hilt et al. | 709/238 |
| 2009/0089699 | A1* | 4/2009 | Saha et al. | 715/771 |
| 2009/0265458 | A1* | 10/2009 | Baker et al. | 709/224 |
| 2009/0287744 | A1* | 11/2009 | Bernardini et al. | 707/202 |

OTHER PUBLICATIONS

Thiemo Voigt, "Adaptive Resource-based Web Server Admission Control", symposium, 2002, Proceedings of the 7th International Symposium on Computers and Communications, IEEE.
Oracle, "Configuring WebLogic Server to Avoid Overload Conditions", Jul. 2008, http://edocs.bea.com/wls/docs103/config_wls/overload.html.
Yixin Diao, "Using MIMO feedback control to enforce policies for interrelated metrics with application to the Apache web server", Proc. NOMS 2002, 219-234, Apr. 2002, Italy.

* cited by examiner

*Primary Examiner* — Zarni Maung
(74) *Attorney, Agent, or Firm* — Vazken Alexanian

(57) ABSTRACT

A method and system for controlling load admission rate of an application server is provided. In the method, actual heap utilization and load admission rate of the application server in current control cycle are detected; based on the detected actual heap utilization and load admission rate, load characteristics variation parameters of the application server are estimated; and control gain of a feedback controller is calculated based on the load characteristics variation parameters; the feedback controller calculates desired load admission rate of the application server in next control cycle by using the calculated control gain. The load admission rate of the application server can be adaptively controlled by tracking changes in workload characteristics of the application server, such that the actual heap utilization of the application server is maintained at or close to target heap utilization.

33 Claims, 12 Drawing Sheets

METHOD AND APPARATUS FOR CONTROLLING LOAD ADMISSION RATE OF AN APPLICATION SERVER

CROSS REFERENCE TO RELATED APPLICATION

This application claims priority under 35 U.S.C. §119 from Chinese Patent Application No. 200910141192.7 filed May 26, 2009, the entire contents of which are incorporated by reference herein.

BACKGROUND OF THE INVENTION

1. Field of the Invention

The present invention relates to the field of computers. More particularly, the present invention relates to memory overload protection in the technology of heap management of an application server.

2. Description of the Related Art

Memory overload is one of the key challenges in managing enterprise application server performance such as in J2EE application server environment. Generally, such an application server is mainly implemented by Java virtual machine, which has limited memory capacity. The memory of the application server is continually used by various applications, and garbage collection (GC) is automatically applied to reclaim the unused space from the memory heap. If the actual heap utilization of the application server reaches the maximum available heap size, the application server will be out of memory, which results in the crash of the application server. In addition, when the actual heap utilization is high, the performance of the application tends to degrade dramatically, which is crucial for real-time applications, such as Session Initiation Protocol (SIP) applications.

In the SIP applications such as Voice over IP (VoIP) applications, SIP was adopted as the signaling protocol for establishing SIP sessions between SIP clients in an IP network. FIG. 1 illustrates a message flow of a SIP session. As shown in FIG. 1, a SIP server provides a SIP session application to a SIP client. A calling SIP client initiates a call by an INVITE message, and establishes a SIP session with a called SIP client through the SIP server. During the session, the SIP server records the relevant information of the SIP session, which is typically tens to hundreds of K bytes. Then, either of the SIP clients can terminate the session by a BYE message. A typical call duration distribution is lognormal with an average between 60 and 300 seconds. However, sometimes the SIP session would hold the memory of the SIP server for a long time, for example, 400 seconds or more. Therefore, if there is a plurality of such SIP sessions, the SIP server's available memory would be readily exhausted, thus increasing SIP server's risk of crashing.

In addition, the actual heap utilization of the application server is also directly impacted by multiple factors such as call arrival rate, call hold time, and memory being held during a call. Furthermore, in an enterprise environment, all of these factors are highly variable and some of them are even difficult to be captured at runtime. For example, the range of the call hold time can vary from several seconds to hundreds of minutes.

To prevent memory overload, currently some memory overload protection schemes for the application server have been proposed. For example, the memory overload protection scheme provided by BEA Inc. requires explicit configuration of parameters such as thread pool size, queue length limit and maximum number of HTTP sessions. However, these parameters do not directly reflect the application server's actual heap utilization and generally are set based on the system administrator's experience. As the characteristics of each application often vary over time, it is hard to set the optimal values for the above parameters, which may result in that the memory overload protection cannot be performed effectively. Details on such memory overload protection scheme can be found in *Configuring WebLogic Server to Avoid Overload Conditions, Oracle*, which is available at http://edocs.bea.com/wls/docs103/config_wls/overload.html.

Recently, it is also proposed to apply control theory based analytical methods to performance and memory management of the application server. For example, a scheme for managing CPU and heap utilization by a multiple-input multiple-output controller is proposed in "Using MIMO feedback control to enforce policies for interrelated metrics with application to the Apache web server" written by Y. Diao, N. Gandhi, J. L. Hellerstein, S. Parekh, and D. M. Tilbury, in which the MIMO controller manipulates the related tuning parameters such as the maximum number of clients. However, in this scheme, because the controller's control gain is a fixed value, the changes in the application characteristic cannot be tracked very well.

SUMMARY OF THE INVENTION

The present invention provides a method and apparatus for controlling load admission rate of an application server, which can track changes in application characteristics in real time and adaptively regulate the load admission rate of the application server based on the changes, so as to prevent memory overload.

According to one aspect of the present invention, there is provided a method for controlling load admission rate of an application server, which includes the steps of: detecting actual heap utilization and load admission rate of the application server in current control cycle; estimating load characteristics variation parameters of the application server based on the detected actual heap utilization and load admission rate; calculating control gain of a feedback controller based on the load characteristics variation parameters; and calculating, by the feedback controller, desired load admission rate of the application server in next control cycle by using the calculated control gain.

According to another aspect of the present invention, there is provided an apparatus for controlling load admission rate of an application server, which includes: a detection module that detects actual heap utilization and load admission rate of the application server in a current control cycle; a parameter estimation module that estimates load characteristics variation parameters of the application server based on the actual heap utilization and load admission rate detected by the detection module; a gain calculation module that calculates control gain of a feedback controller based on the load characteristics variation parameters; and the feedback controller that calculates desired load admission rate of the application server in next control cycle by using the control gain calculated by the gain calculation module.

According to a further aspect of the present invention, there is provided an application server control system, which includes: at least one application server; and at least one apparatus for controlling load admission rate of an application server, which controls the load admission rate of the respective application servers.

DETAILED DESCRIPTION OF THE PREFERRED EMBODIMENTS

The present invention will become more apparent from the following detailed description of the embodiments of the invention in conjunction with the drawings.

Figure 1:
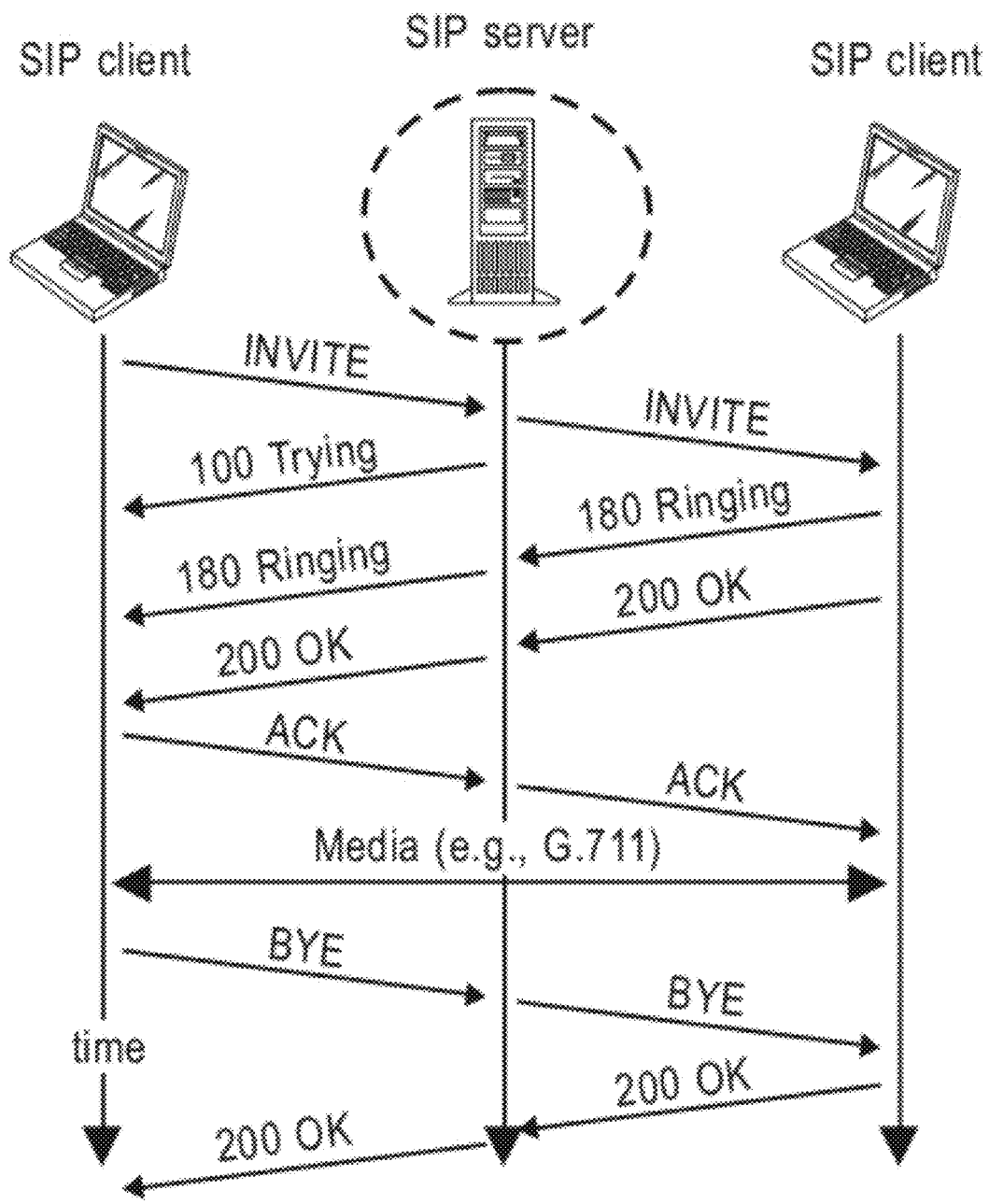
FIG. 1 is a diagram illustrating a message flow for a SIP session.
Figure 2:
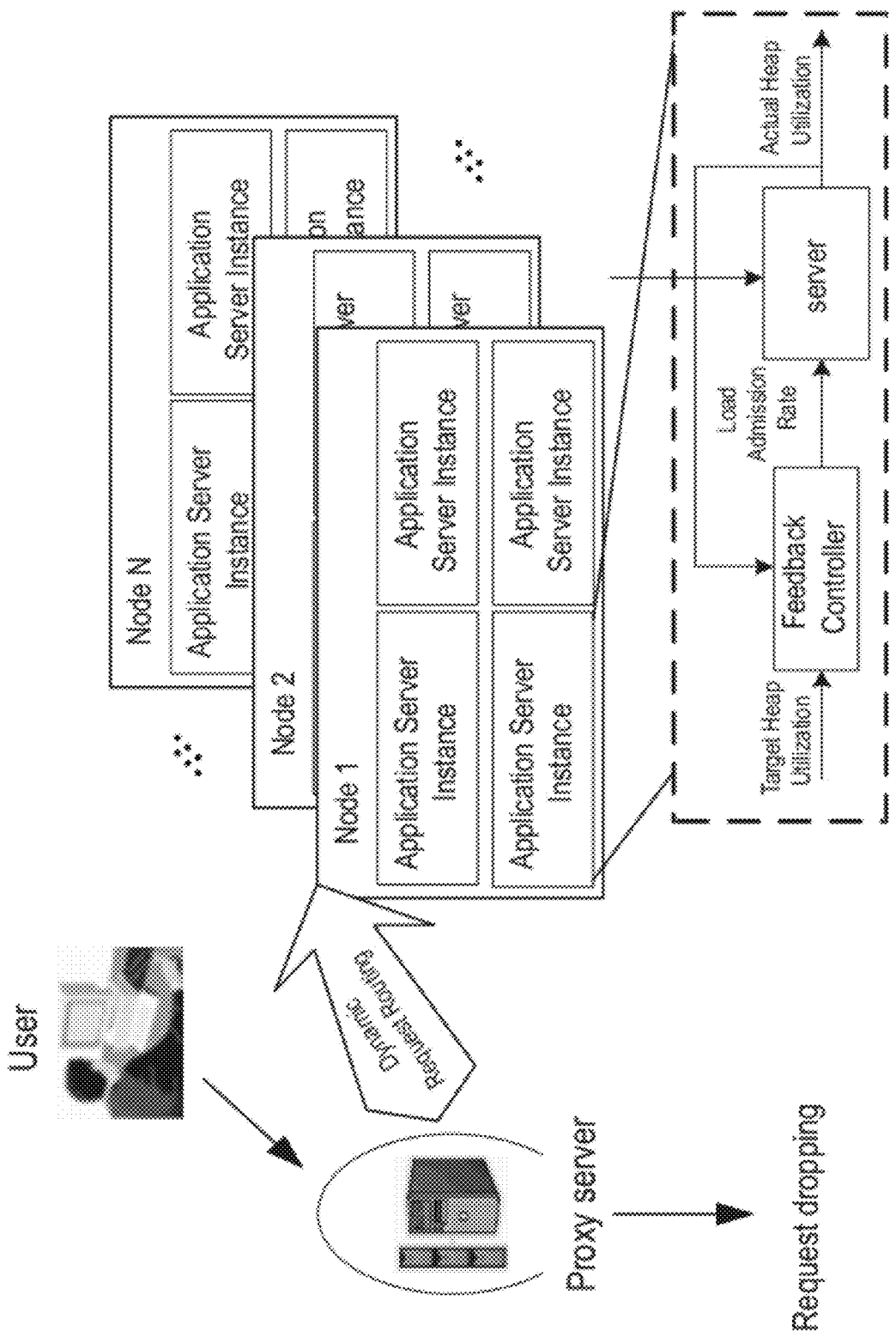
FIG. 2 is a diagram of a J2EE application server environment to which memory overload control is applied.

In the following embodiments, an application server can be implemented in a virtual machine or a physical machine with limited memory capacity. The application server, as a control object of a feedback controller, accepts the control of the feedback controller to prevent memory overload. FIG. 2 shows a J2EE application server environment in which the memory overload control is used. As shown in FIG. 2, user requests are sent to a proxy server, which represents an entry point into the J2EE application server environment, and the proxy server applies dynamic request routing to fulfill quality of service objectives. The requests are then distributed to back-end servers composed of multiple server nodes, each of which may have multiple application server instances.

There is one feedback controller to perform the memory overload protection in each application server instance. The feedback controller controls the load admission rate of the application server instance according to the control objective that is to maintain target heap utilization set by the administrator, so as to regulate the actual heap utilization of the application server instance. The load admission rate of each application server instance is provided to the proxy server, such that the proxy server adjusts the workload provided to the application server instance, so as to prevent the memory overload for the application server instance. In the control process, the actual heap utilization means the non-garbage heap usage, that is, the heap utilization collected every time a global garbage collection ends, which reveals the real heap utilization.

Figure 3:
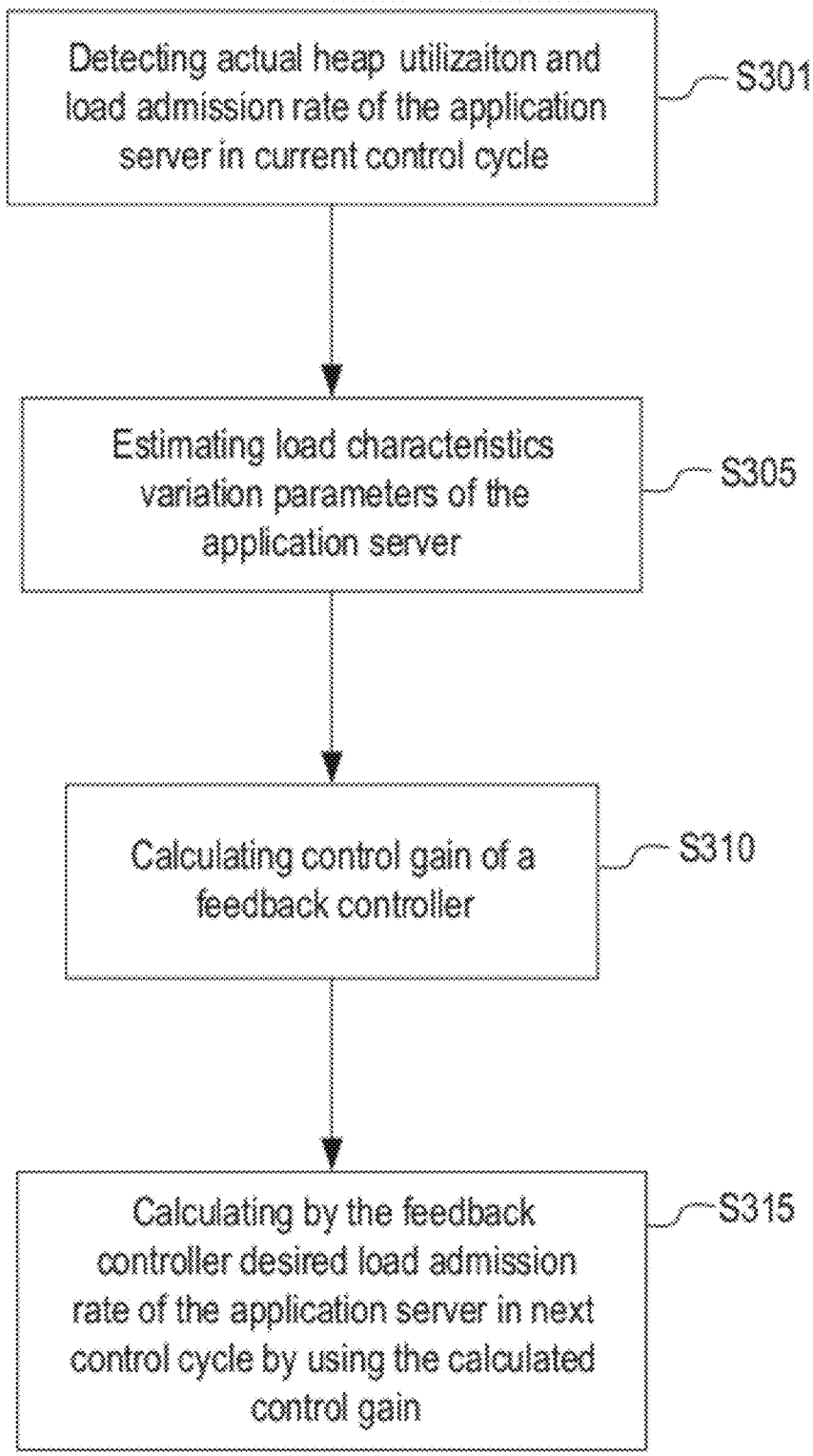
FIG. 3 is a flowchart of a method for controlling load admission rate of an application server by using a feedback controller according to one embodiment of the present invention.

FIG. 3 is a flowchart of a method for controlling load admission rate of an application server by using a feedback controller according to one embodiment of the present invention. Next, this embodiment will be described in detail in conjunction with the figure.

As shown in FIG. 3, at S301, the actual heap utilization and load admission rate of the application server in current control cycle is detected. As mentioned above, the actual heap utilization may be detected every time the global garbage collection ends. Thus, the length of the control cycle can be determined by the global garbage collection interval. An application server's workload characteristics can be reflected by three parameters: load admission rate, application duration and actual heap utilization per load. For example, for a SIP application server, the load admission rate is arrival rate of new session, the application duration is the session (call) hold time, and the actual heap utilization per load is memory held by per call.

At S305, the load characteristics variation parameters of the application server are estimated based on the actual heap utilization and load admission rate detected at S301. In this embodiment, first, a heap utilization model is established for the application server, which can reflect changes in the workload characteristics.

Next, taking for example a SIP application, the process of establishing a heap utilization model for a SIP application server will be described in detail. Assume that $u_k$ and $y_k$ represent the call admission rate (load admission rate) and the actual heap utilization in the $k^{th}$ control cycle respectively, and represents the interval (step size) between the control cycles. Further, assume that the average actual heap utilization of each session (call) is >0. For simplicity, assume that the session length M is geometrically distributed in the number of control cycles, such that the session length includes at least one control cycle, then:

$$\text{Prob}[M=m]=(1-)^{m-2} \quad (1)$$

wherein m=2, 3, . . . , is a parameter of the geometric distribution and 0<<1. Therefore, the mean session length E[M] is:

$$E[M]=(1+)/ \quad (2)$$

The complementary distribution function (or survival function) of M is:

$$\text{Prob}[M>m]=(1-)^{m-1}$$

The actual heap utilization $y_k$ in the control cycle k includes contributions of the actual heap utilization of the sessions which arrived earlier than the control cycle k and survived till the control cycle k. Thus, we have $$y_k = \beta \sum_{i=0}^{k-1} u_i \Delta (1-\rho)^{k-i-1} \quad (3)$$

where $k \geq 1$, $u_i$ is the average number of the sessions, which arrived in the control cycle i, and $(1-)^{k-i-1}$ is the probability that the session, which arrived in the control cycle i, is still alive in the control cycle k. Defining $$a = 1- \qquad (4)$$

and $$b = \qquad (5)$$

Then the equation (3) is rewritten as $$y_k = b \sum_{i=0}^{k-1} u_i a^{k-i-1} \qquad (6)$$

where $k \geq 1$, $0 < a < 1$, $b > 0$. From the equations (2) and (4), the parameter a could be written in terms of E[M] as $$a = \frac{E[M] - 2}{E[M] - 1} \qquad (7)$$

Thus, given a general session length distribution with mean E[M], the value of the parameter a can be estimated by the equation (7). The parameter b can be determined by the equation (5), and it is simply the product of the average actual heap utilization per session and the step size.

Using the equation (6) and taking the difference between $y_k$ and $y_{k-1}$, the following equation can be obtained:

$$y_k = a y_{k-1} + b u_{k-1} \qquad (8)$$

where $k \geq 1$. The equation (8) is a first-order linear autoregression moving average hybrid model ARMA(1,1) in which the coefficient of $u_k$ is zero. The parameter a is the autoregressive parameter, which captures the change in the actual heap utilization, and the parameter b is the moving average parameter, which captures the dependence of the actual heap utilization on the (prior) call admission rate.

It can be seen from the above description that the heap utilization model of the SIP application server can associate the actual heap utilization with the load admission rate, and the parameters of the heap utilization model can be considered as the load characteristics variation parameters that reflect the changes in the workload characteristics. Although in the above description, the heap utilization model is the first-order model, a person skilled in the art can easily conceive that the heap utilization model can be a second-order or higher order model, such as $y_k = a_1 * y_{k-1} + a_2 * y_{k-2} + b_1 * u_{k-1} + b_2 * u_{k-2}$, in which $a_1$, $a_2$, $b_1$ and $b_2$ are the model parameters.

After establishing the heap utilization model, the parameters of the established heap utilization model are estimated based on the detected load admission rate and actual heap utilization. The parameter estimation method can be a linear fitting method such as Kalman filtering method, or least square method. In this embodiment, the parameters are estimated by using the Kalman filtering method. The Kalman filtering method is well known to a person skilled in the art and its description will be omitted.

Figure 4A:
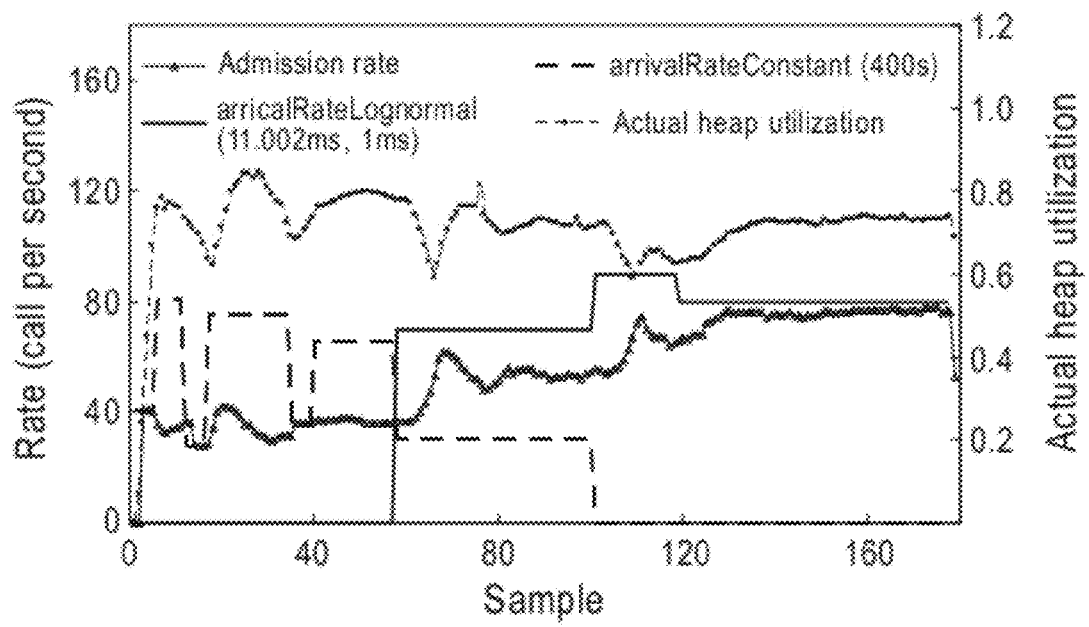
FIG. 4 is a graph showing the load characteristics variation parameters estimated by Kalman filtering method for an application, which mixes two different call hold time distributions.
Figure 4B:
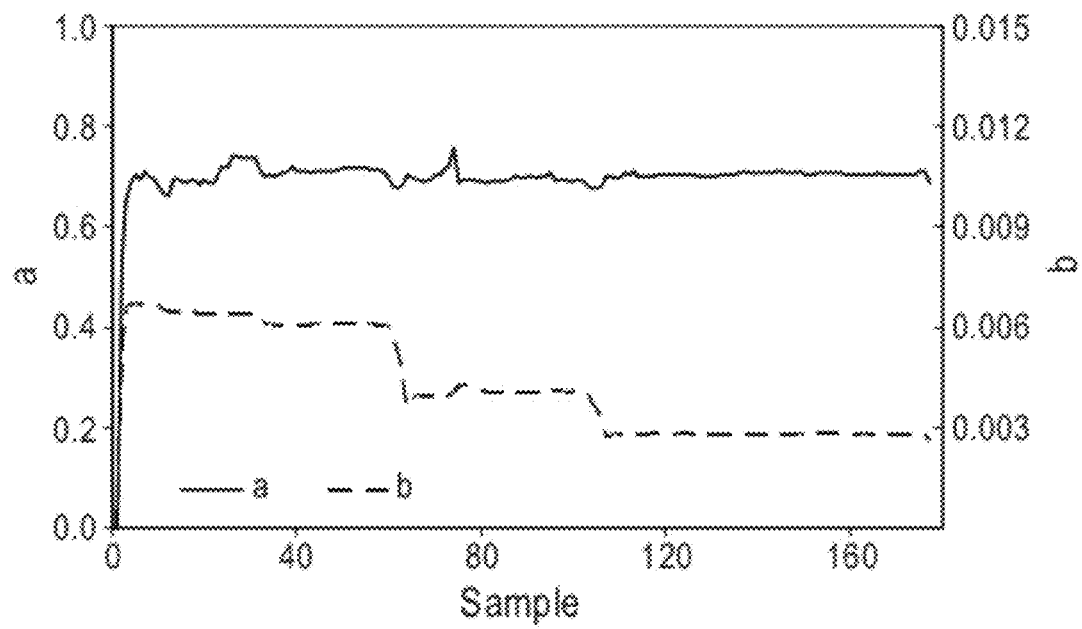

FIG. 4 illustrates a graph showing the load characteristics variation parameters estimated by the Kalman filtering method for an application which mixes two different call hold time distributions. FIG. 4(a) is the graph showing the application and the detected load admission rate and actual heap utilization. FIG. 4(b) is the graph showing the estimated load characteristics variation parameters a and b. In FIG. 4(a), the left longitudinal axis represents the load admission rate and the right longitudinal axis represents the actual heap utilization. The curve marked with "solid line plus triangle" is the curve of the admission rate and the curve marked with "dashed line plus square" is the curve of the actual heap utilization. The dashed line represents a traffic flow arrivalRateConstant(400 s) for which the call hold time is a fixed value of 400 seconds. The solid line represents a traffic flow arrivalRateLognormal (11.002 ms, 1 ms) for which the call hold time has lognormal distribution Log-N(11.002 ms, 1.0 ms).

According to proportions of the two call hold time distributions in the application, the workload of the application can be divided into three phases: at a first phase which is before 60, the workload is only the traffic flow arrivalRateConstant (400 s); at a second phase from 60 to 100, the workload is changed as a mixture of the traffic flow arrivalRateConstant (400 s) and the traffic flow arrivalRateLognormal (11.002 ms, 1 ms), after 100, the workload is changed as only the traffic flow arrivalRateLognormal (11.002 ms, 1 ms). In FIG. 4(b), a solid line represents the parameter a and a dashed line represents the parameter b. It can be seen that the curve of parameter b is also clearly divided into three phases and is converged rapidly for each phase, which indicates that the heap utilization model can react to the changes in the workload rapidly and can be converged very fast.

Returning to FIG. 3, at S310, control gain of a feedback controller is calculated based on the load characteristics variation parameters estimated at S305. In this embodiment, a proportional plus integral (PI) controller is used as the feedback controller, whose control gain is updated with pole placement method.

Generally, control law of the proportional plus integral controller is $$v_k = K_p e_k + K_i \sum_{j=1}^{k-1} e_j$$

wherein $v_k$ is the output of the controller and used as control input of the control object, and $e_k$ is control error between the reference signal and the output of the control object. In this embodiment, $v_k$ corresponds to the desired load admission rate of the application server, the reference signal is the target heap utilization set by the administrator, the control object is the application server and its output is the actual heap utilization. The proportional plus integral controller has two terms: the proportional term parameterized with the proportional control gain $K_p$ and the integral term parameterized with the integral control gain $K_i$. Generally, the proportional term is used to increase response speed and the integral term is used to eliminate any steady-state error.

For the proportional plus integral controller, the proportional control gain $K_p$ and integral control gain $K_i$ must satisfy the desired control specifications. A commonly used approach to design the proportional control gain $K_p$ and integral control gain $K_i$ is called a pole placement method, in which the closed-loop system performance is determined by the closed loop pole positions chosen for some performance criteria (for example. small settling time and overshoot).

Specifically, the input-output relationship of the proportional plus integral controller used in this embodiment is:

$$u_k = u_{k-1} + (K_p + K_i) * e_k - K_p * e_{k-1} \qquad (9)$$

wherein k represents the control cycle, $e_k = r - y_k$ is the control error related to the actual heap utilization, r represents the target heap utilization, $y_k$ represents the actual heap utilization in the $k^{th}$ control cycle, $u_k$ represents the desired load admission rate in the $k^{th}$ control cycle, and $u_{k-1}$ represents the load admission rate in the $k-1^{th}$ control cycle.

When the proportional control gain $K_p$ and integral control gain $K_i$ are determined by the pole placement method, first, pole positions are determined based on the desired closed loop system performance indexes, such as settling time and maximum overshoot. In this embodiment, the proportional plus integral controller and the application server constitute a closed loop system. The closed loop transfer function after z-transformation is $$F_R(z) = \frac{bK_i z + bK_p(z-1)}{z^2 + (bK_i + bK_p - 1 - a)z + a - bK_p},$$

and the desired closed loop performance can be expressed as $(z-p_1)(z-p_2)=z^2-(p_1-p_2)z+p_1p_2$, wherein $p_1$ and $p_2$ represent the poles and reflect the desired control performance quantified by the settling time and the maximum overshoot. Specifically, in Z domain, the poles $p_1$ and $p_2$ are the complex conjugates and can be expressed as $p_1, p_2 = re^{\pm j\theta}$, wherein $r$ represents modulus of a complex number, represents argument of the complex number, and they meet the following requirement:

$$r = e^{-4/k_s^*}$$

$$\theta = \pi \frac{\log r}{\log M_p^*}$$

wherein $k_s^*$ represents the settling time and $M_p^*$ represents the maximum overshoot.

According to the pole placement method, there are the following equations:

$$bK_i + bK_p - 1 - a = p_1 + p_2$$

$$a - bK_p = p_1 p_2$$

Therefore, the proportional control gain $K_p$ and the integral control gain $K_i$ can be respectively calculated as:

$$K_p = \frac{a - p_1 p_2}{b} \quad (10)$$

$$K_i = \frac{1 - (p_1 + p_2) + p_1 p_2}{b} \quad (11)$$

wherein the load characteristics variation parameters a and b can be obtained at S305.

The scenario in which the feedback controller is a proportional plus integral controller has been described above. However, the feedback controller can also be a proportional (P) controller, an integral (I) controller, or a proportional plus integral plus derivative (PID) controller.

In another embodiment, the feedback controller is the proportional controller, and its input-output relationship is $u_k = u_{k-1} + K_p * (e_k - e_{k-1})$, wherein $e_k = r - y_k$, r represents the target heap utilization, $y_k$ represents the actual heap utilization in the $k^{th}$ control cycle, $u_k$ represents the desired load admission rate in the $k^{th}$ control cycle, $u_{k-1}$ represents the load admission rate in the $k-1^{th}$ control cycle, and $K_p$ represents the proportional control gain.

In another embodiment, the feedback controller is an integral controller, and its input-output relationship is $u_k = u_{k-1} + K_i * e_k$, wherein k represents the control cycle, $e_k = r - y_k$, r represents the target heap utilization, $y_k$ represents the actual heap utilization in the $k^{th}$ control cycle, $u_k$ represents the desired load admission rate in the $k^{th}$ control cycle, $u_{k-1}$ represents the load admission rate in the $k-1^{th}$ control cycle, and $K_i$ represents the integral control gain.

In another embodiment, the feedback controller is a proportional plus integral plus derivative controller, and its input-output relationship is $u_k = u_{k-1} + (K_p + K_i + K_d) * e_k - (K_p + 2K_d)e_{k-1} + K_d e_{k-2}$, wherein k represents the control cycle, $e_k = r - y_k$, r represents the target heap utilization, $y_k$ represents the actual heap utilization in the $k^{th}$ control cycle, $u_k$ represents the desired load admission rate in the $k^{th}$ control cycle, $u_{k-1}$ represents the load admission rate in the $k-1^{th}$ control cycle, $K_p$ represents the proportional control gain, $K_i$ represents the integral control gain, and $K_d$ represents the derivative control gain.

In the above three scenarios, the setup of the respective control gains of the feedback controllers is similar to that of the proportional plus integral controller, and the pole placement method could be used and its description is omitted here.

Next, returning to FIG. 3, at S315, the feedback controller calculates the desired load admission rate of the application server in next control cycle by using the control gain obtained at S310. The calculated desired load admission rate is provided to the proxy server to control the workload assigned to the application server, so as to regulate the application server's actual heap utilization.

In the input-output relationship formulas of the feedback controllers, the load admission rate in the $k-1^{th}$ control cycle is usually the desired load admission rate obtained in the previous control cycle. However, sometimes the workload is not large enough, thus the memory consumption cannot reach the target heap utilization, which may cause the positive control error, and the desired load admission rate become increasingly high in the subsequent control cycles so that the saturation will occur. Thus, when the workload becomes larger again, the desired load admission rate will become even higher, which may cause the memory overload for the application server. To prevent saturation, in the present embodiment, the load admission rate in the $k-1^{th}$ control cycle uses the load admission rate detected in S301.

Figure 5A:
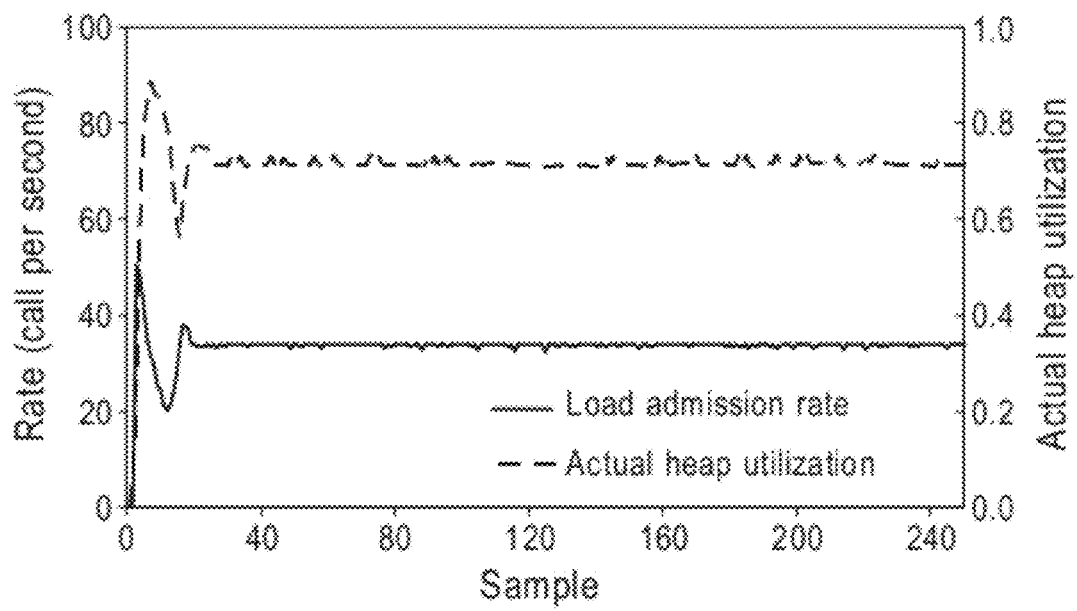
FIG. 5 is a graph showing the load characteristics variation parameters estimated by Kalman filtering method for an application with steady call admission rate and constant call hold time.
Figure 5B:
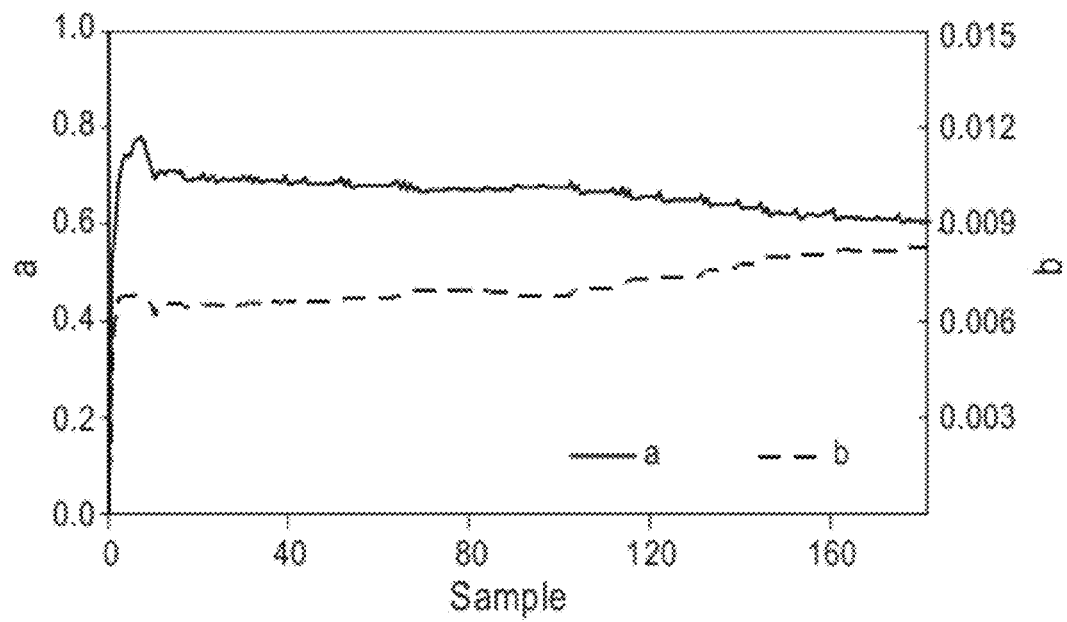

Further, when the controller is converged, both the control input and the system output would remain unchanged. However, due to the noise, parameter drift may occur when estimating the load characteristics variation parameters. FIG. 5 illustrates a graph showing the load characteristics variation parameters estimated by the Kalman filtering method in an application with steady call admission rate and constant call hold time, wherein FIG. 5(a) is the graph showing the traffic flow as workload and the detected load admission rate and actual heap utilization. FIG. 5(b) is the graph showing the estimated load characteristics variation parameters a, b. As shown in FIG. 5(a), the load admission rate and the actual heap utilization are unchanged for a long time after the controller is converged. In FIG. 5(b), the load characteristics variation parameters a, b do not maintain the fixed value and have slowly drifted. If the gain control is calculated based on the drifted load characteristics variation parameters a, b, the controller performance will be degraded.

To avoid impact caused by the parameter drift, in another embodiment, before the step S310, invariability of the workload characteristics is detected. For example, invariability of either of the load admission rate and the actual heap utilization may be detected. Specifically, first variance of the load admission rate or the actual heap utilization in a given number of control cycles is calculated, wherein the given number can be determined by the size of a moving window. Then, it is determined whether the calculated variance of the load admission rate or the calculated variance of the actual heap utilization exceeds a corresponding predetermined threshold. When the variance of the load admission rate or the variance of the actual heap utilization exceeds the corresponding predetermined threshold, which indicates that the load admission rate or the actual heap utilization has changed, then the workload characteristics is considered to have changed and the step S310 is performed.

In addition, both the variance of the load admission rate and the variance of the actual heap utilization can be calculated. When both the variance of the load admission rate and the variance of the actual heap utilization exceed the corresponding predetermined threshold, the workload characteristics is considered to have changed. When either of the calculated variance of the load admission rate and the calculated variance of the actual heap utilization exceeds the corresponding predetermined threshold, the workload characteristics is considered to have changed. When neither the variance of the load admission rate nor the variance of the actual heap utilization exceeds the predetermined threshold, which indicates that both the load admission rate and the actual heap utilization remain unchanged, then the current control gain is kept unchanged and the calculation of the feedback controller's control gain is not necessary.

It can be seen from the above description that the method for controlling load admission rate of an application server of the present embodiment can self-adaptively control the load admission rate when the workload is changed by tracking the changes in the workload characteristics of the application server, such that the actual heap utilization of the application server is maintained at or close to the target heap utilization. The method of the present embodiment is not limited to a SIP application server or J2EE environment. For the memory system of the application server, as long as the workload is composed of a request flow that makes an application to be executed and uses memory resource, and memory resource will be collected after the entire period in which the request is served, the method of the present embodiment will be applicable. In addition, with the method of the present embodiment, a system administrator only needs to set the target heap utilization. The method is simple and convenient in comparison to the existing memory overload protection scheme.

Figure 6A:
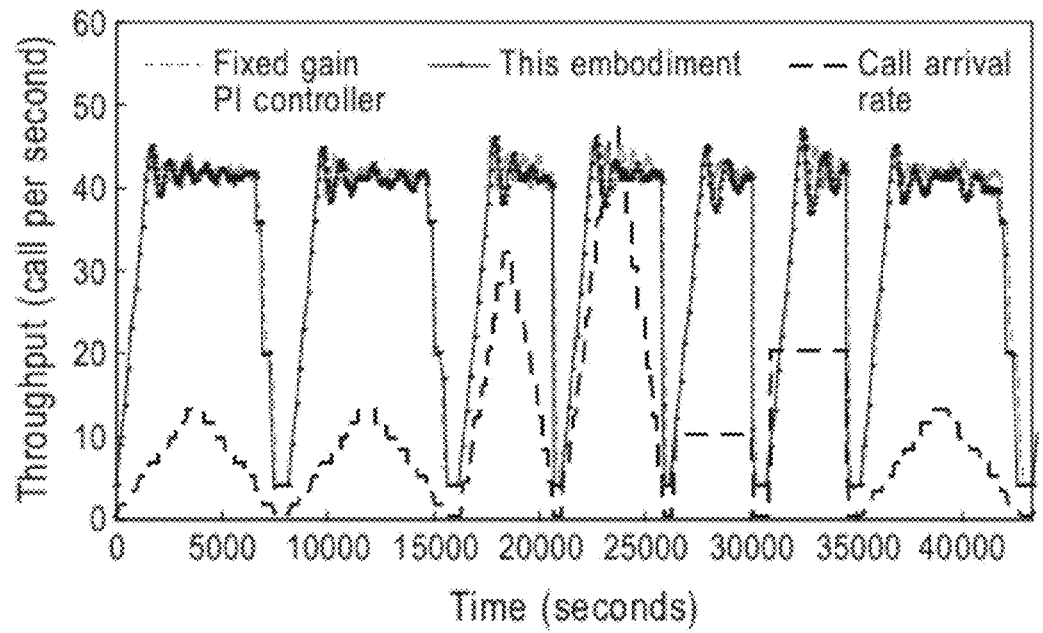
FIG. 6 is a graph showing the throughput and actual heap utilization of the application server obtained by using the method of the present embodiment and the existing fixed gain controller respectively when workload is a call with constant call hold time of 400 seconds, wherein the feedback controller used in the method of this embodiment is a proportional plus integral controller.
Figure 6B:
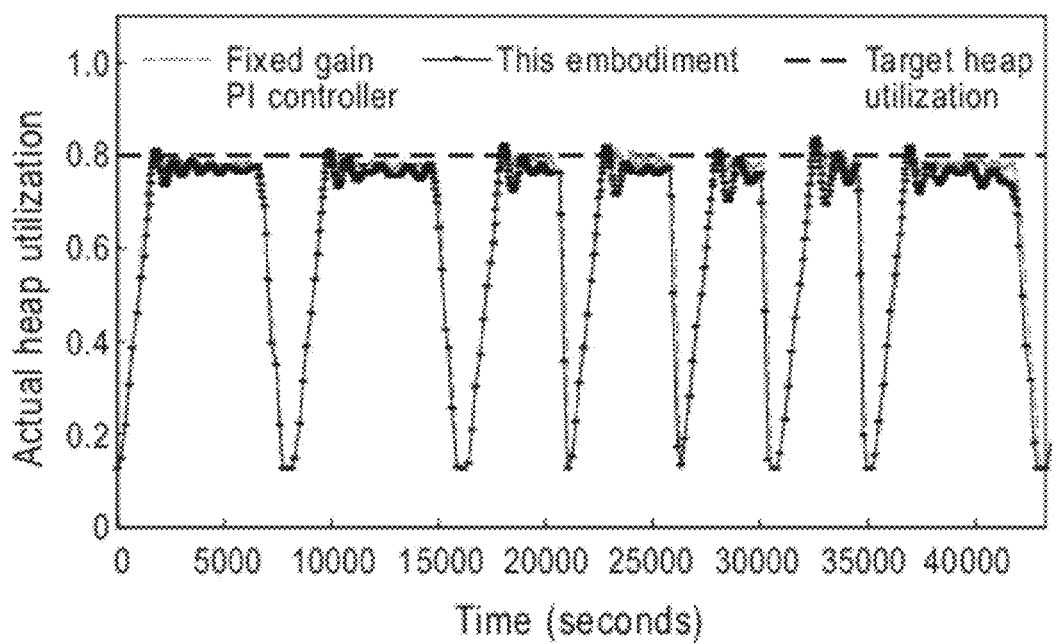

FIG. 6 is a graph showing the throughput and actual heap utilization of the application server obtained by using the method of the present embodiment and the existing fixed gain controller respectively when workload is a call with constant call hold time of 400 seconds, wherein the feedback controller used in the method of this embodiment is a proportional plus integral controller. FIG. 6(a) shows the graph of the throughput, in which a thin and short dashed line represents the throughput obtained by the fixed gain PI controller, a solid line represents the throughput obtained by the method of the present embodiment, and a thick and long dashed line represents the call arrival rate. FIG. 6(b) shows the graph of the actual heap utilization, in which a thin and short dashed line represents the actual heap utilization obtained by the fixed gain PI controller, a solid line represents of the actual heap utilization obtained by the method of the present embodiment, and a thick and long dashed line represents the target heap utilization. In FIG. 6(a), the call arrival rate is continually changing. In FIG. 6(b), the target heap utilization is set as 0.8. It can be seen from FIGS. 6(a) and 6(b) that because the gain of the fixed gain PI controller is selected appropriately, the two manners obtain very good control performance, when the workload changes, the actual heap utilization quickly converged to 0.8, and the throughput only has little oscillation for 40 calls per second.

Figure 7A:
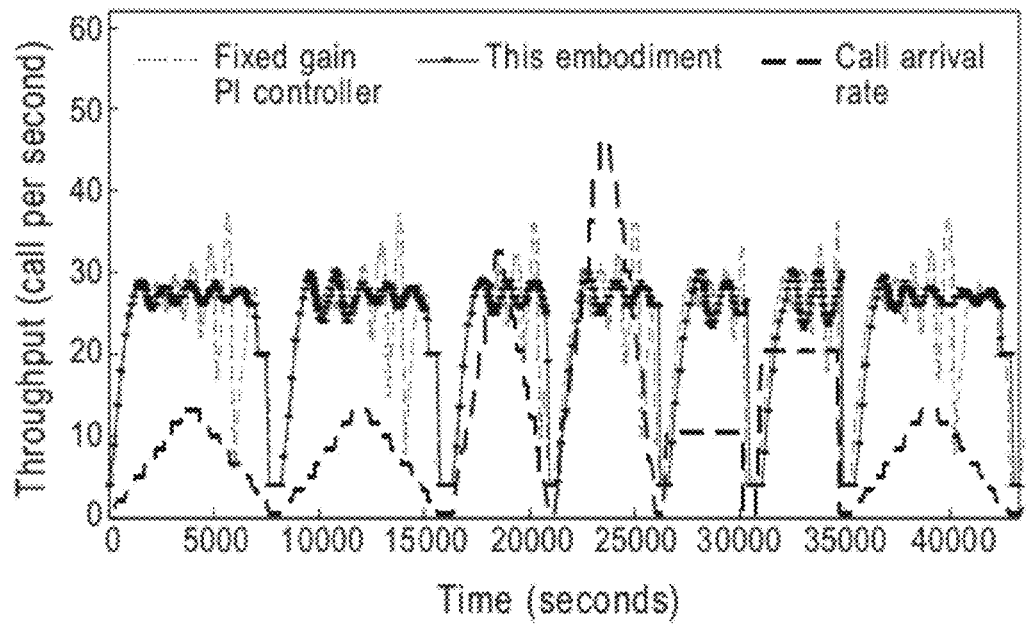
FIG. 7 is a graph showing the throughput and actual heap utilization of the application server obtained by using the method of the present embodiment and the existing fixed gain controller respectively when workload is a call with constant call hold time of 600 seconds, wherein the feedback controller used in the method of this embodiment is a proportional plus integral controller.
Figure 7B:
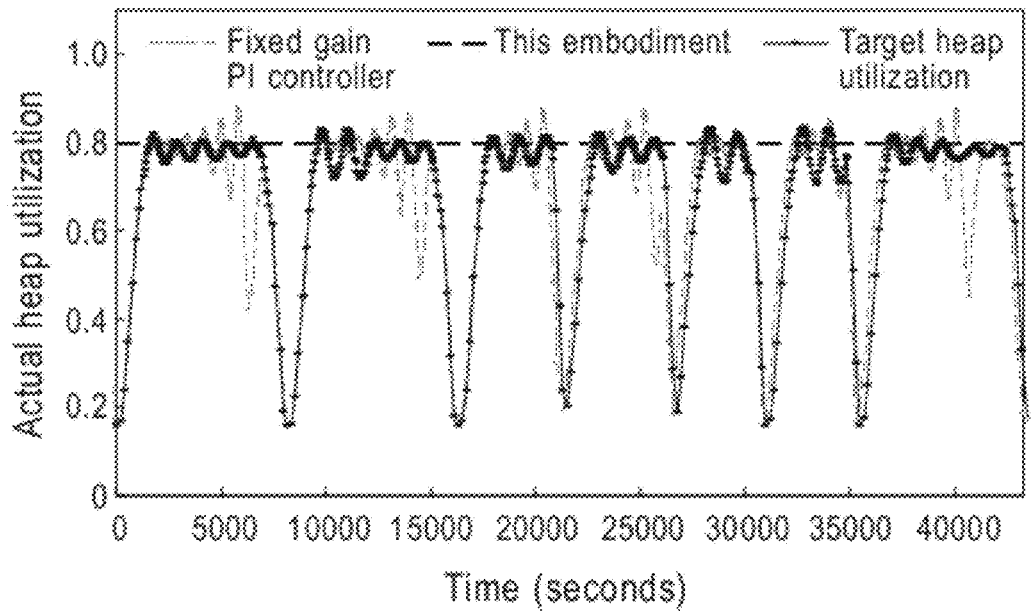

FIG. 7 is a graph showing the throughput and actual heap utilization of the application server obtained by using the method of the present embodiment and the existing fixed gain controller respectively when workload is a call with constant call hold time of 600 seconds, wherein the feedback controller used in the method of this embodiment is a proportional plus integral controller. FIG. 7(a) shows the graph of the throughput, in which a thin and short dashed line represents the throughput obtained by fixed gain PI controller, a solid line represents the throughput obtained by the method of the present embodiment, and thick and long dashed line represents the call arrival rate. FIG. 7(b) shows the graph of the actual heap utilization, in which a thin and short dashed line represents the actual heap utilization obtained by fixed gain PI controller, a solid line represents the actual heap utilization obtained by the method of the present embodiment, and a thick and long dashed line represents the target heap utilization. It can be seen from FIGS. 7(a) and 7(b) that, in this case, the changes in the workload bring great effect on the fixed gain PI controller. Relatively longer call hold time makes the fixed gain PI controller overact to the changes in the workload, resulting in a nearly unstable state, in which the actual heap utilization oscillates between 0.4-0.9. Thus at some time, although there is free memory, a large amount of calls are rejected, while at some time, memory is nearly overloading. With the method of the present embodiment, although the workload changes, good control performance can still be achieved: rapid convergence and small oscillation.

Figure 8A:
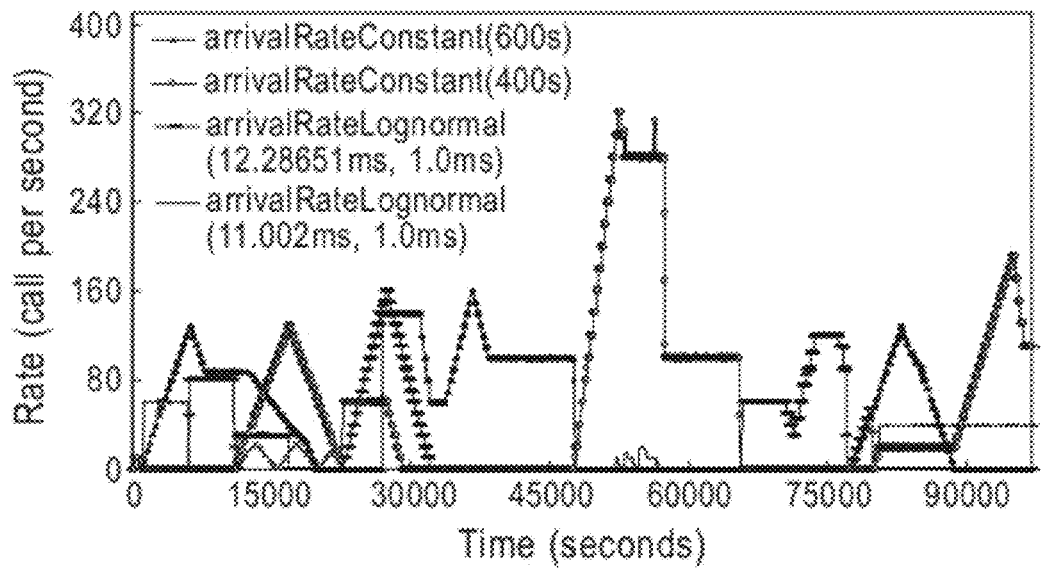
FIG. 8 is a graph showing the throughput and actual heap utilization of the application server obtained by using the method of the present embodiment and the existing fixed gain controller respectively when workload is a call, which mixes four different call hold time distributions, wherein the feedback controller used in the method of this embodiment is a proportional plus integral controller.
Figure 8B:
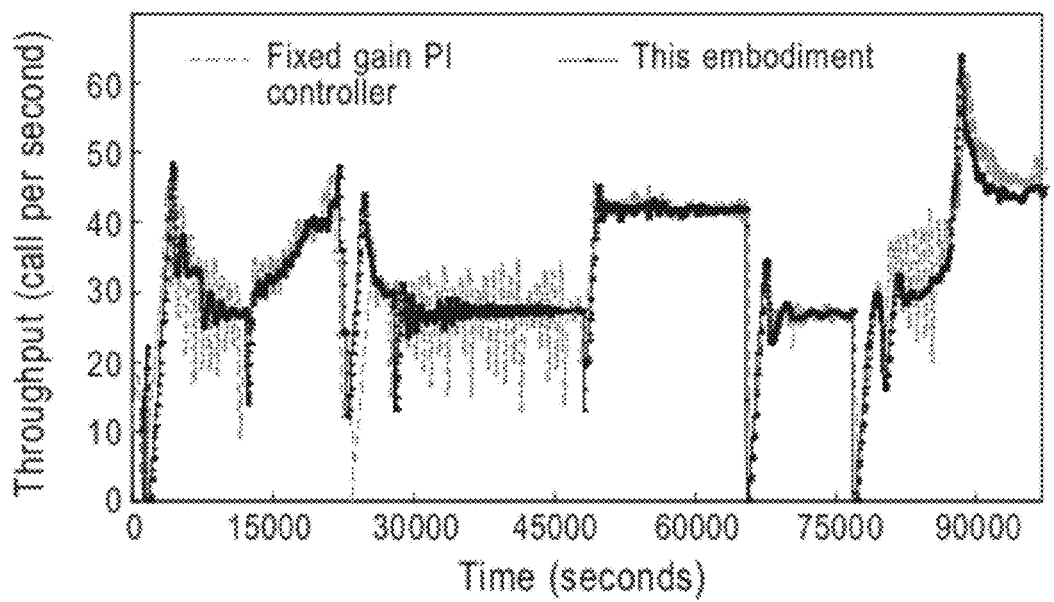
Figure 8C:
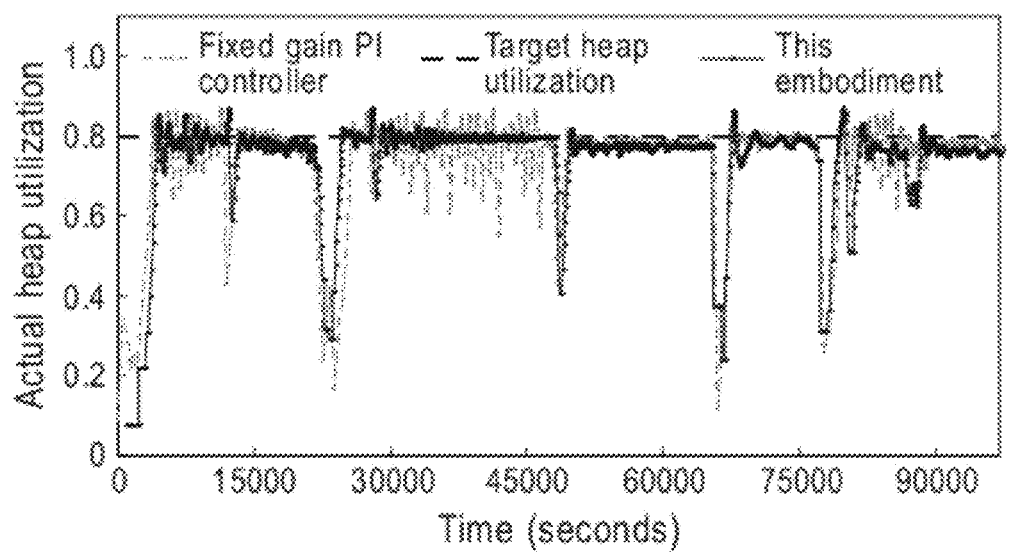

FIG. 8 is a graph showing the throughput and actual heap utilization of the application server obtained by using the method of the present embodiment and the existing fixed gain controller respectively when workload is a call, which mixes four different call hold time distributions, wherein the feedback controller used in the method of this embodiment is a proportional plus integral controller. FIG. 8(a) is the graph of the workload and FIG. 8(b) is the graph of the throughput, in which a solid line represents the throughput obtained by the method of the present embodiment, and a dashed line represents the throughput obtained by the fixed gain PI controller. FIG. 8(c) is the graph of the actual heap utilization, in which solid line represents the actual heap utilization obtained by the method of the present embodiment, thin and short dashed line represents the actual heap utilization obtained by the fixed gain PI controller, and a thick and long dashed line represents the target heap utilization.

As shown in FIG. 8(a), the workload mixes four different call hold time distributions together and interleaves them in a dynamic proportion, these call hold time distributions are: constant call hold time of 600 s, arrivalRateConstant(600 s); constant call hold time of 400 s, arrivalRateConstant(400 s); call hold time with lognormal distribution Log-N(12.28651 ms, 1.0 ms), arrivalRateLognormal (12.28651 ms, 1.0 ms), and call hold time with lognormal distribution Log-N(11.002 ms, 1.0 ms), arrivalRateLognormal (11.002 ms, 1.0 ms). It can be seen from FIGS. 8(b) and 8(c) that the fixed gain PI controller can only provide the good control in certain workloads. With the method of the present embodiment, regardless of the changes in the workload characteristics, the throughput and actual heap utilization of the application server can be rapidly converged with less oscillation. This indicates that the feedback controller can track the changes in the workload very well and make corresponding adjustment.

Figure 9A:
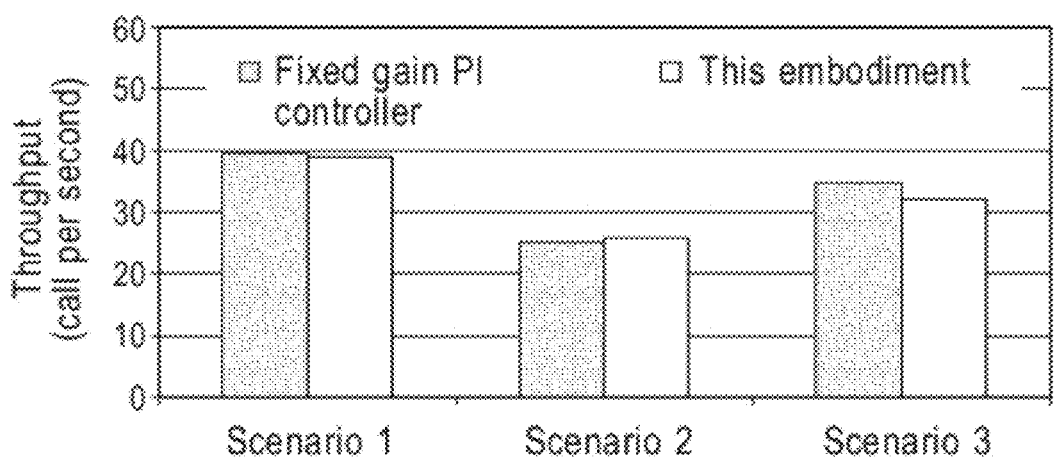
FIG. 9 is a diagram of analysis on the throughput in the three scenarios shown in FIGS. 6 to 8.
Figure 9B:
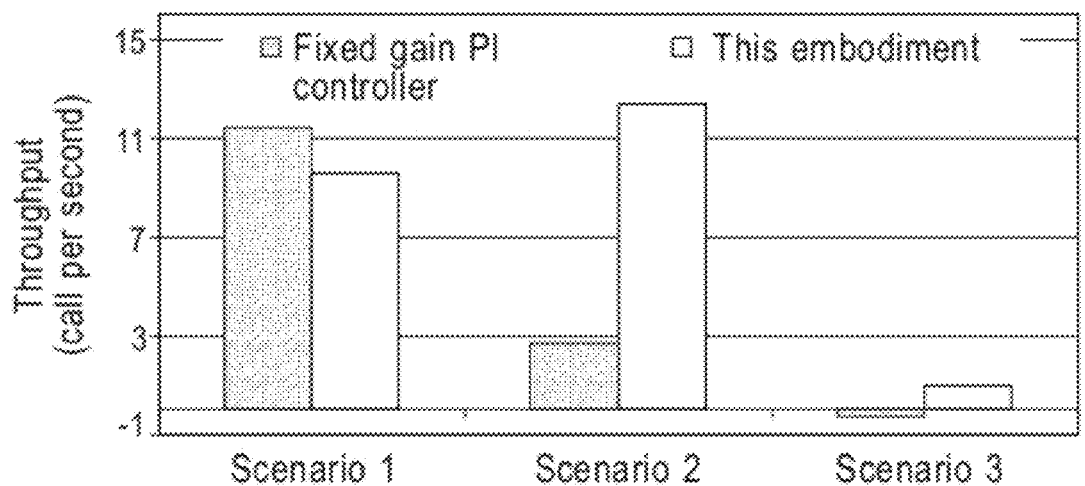

FIG. 9 shows a diagram of analysis on the throughput in three scenarios shown in FIGS. 6 to 8, wherein FIG. 9(a) shows the average throughput in the three scenarios. FIG. 9(b) shows the throughput kurtosis. As shown in FIG. 9(a), the fixed gain PI controller and the method of the present embodiment yield similar average throughput, because they are designed to track the same target heap utilization. However, the variability in the throughput, quantified by the throughput kurtosis in FIG. 9(b), indicates the method of the present embodiment leads to throughput that is much more stable. Kurtosis is a measure of the peakedness degree in a distribution. A zero value corresponds to the peakedness of a normal distribution, positive values indicate narrower distributions with higher peaks, and negative values denote flatter distributions. As shown in FIG. 9(b), for the scenario of FIG. 6, the two manners behave similarly. For the scenario in FIG. 7, the kurtosis of the method of the present embodiment is much higher than that of the fixed gain PI controller, that is, less variation in the throughput. For the scenario in FIG. 8, the kurtosis of the method of the present embodiment is positive while it becomes negative for the fixed gain PI controller, suggesting the high throughput variation for the fixed gain controller.

Figure 10A:
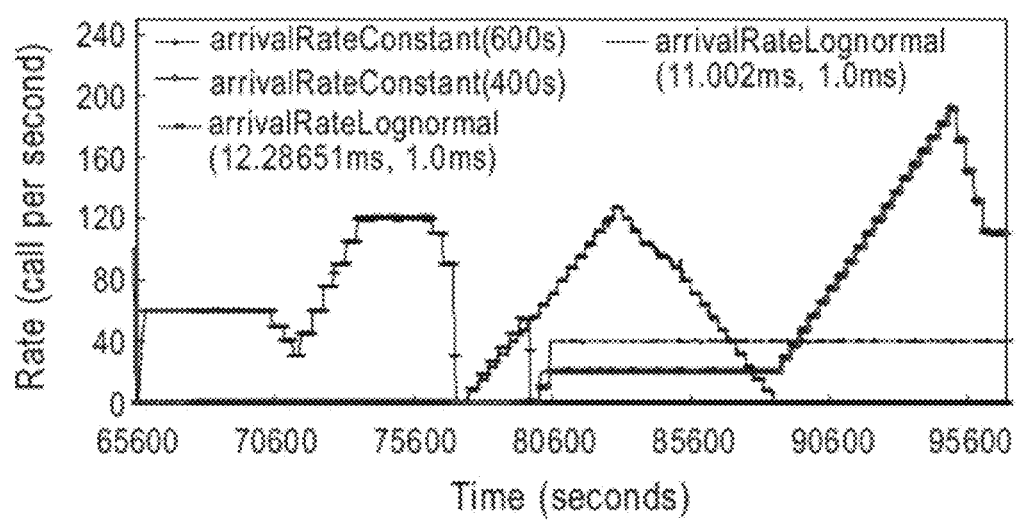
FIG. 10 is a graph showing the relationship between the throughput and actual heap utilization obtained by using the method of the present embodiment when workload is a call, which mixes four different call hold time distributions, wherein the feedback controller used in the method of this embodiment is an integral controller.
Figure 10B:
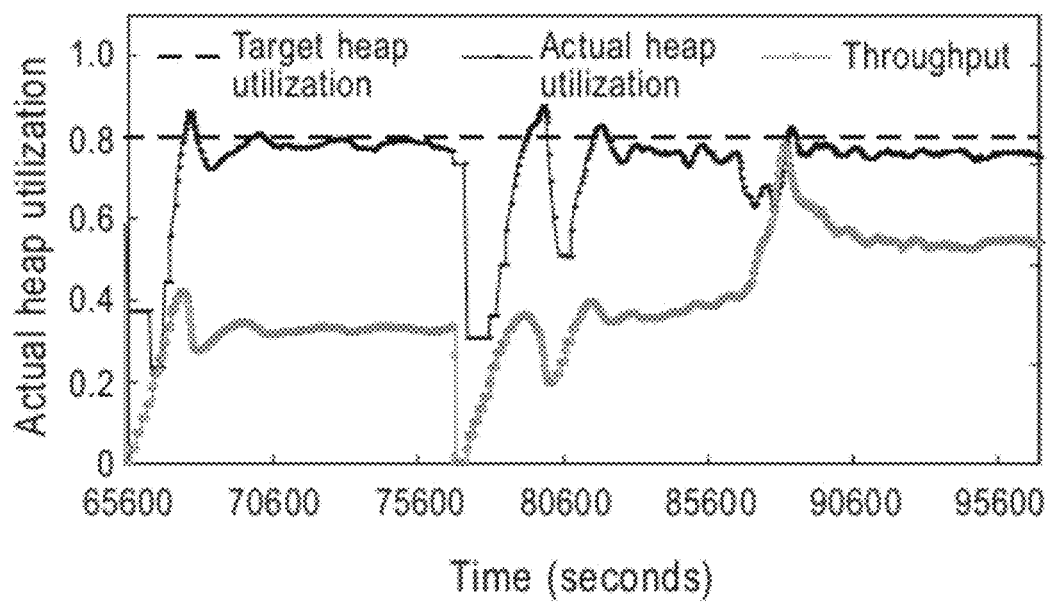
Figure 10C:
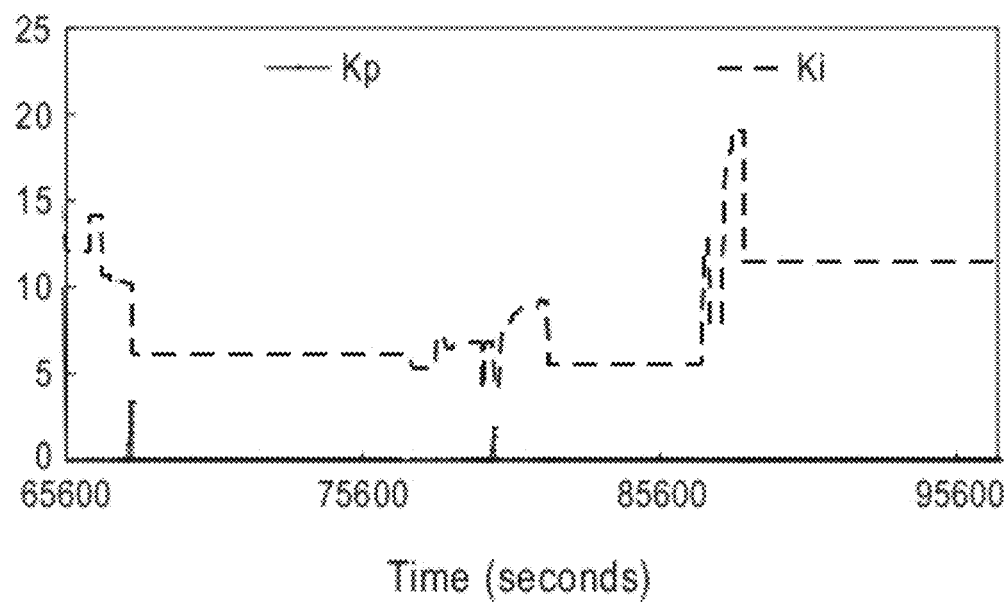

FIG. 10 is a graph showing the relationship between the throughput and the actual heap utilization of the application server obtained by using the method of the present embodiment when workload is a call, which mixes four different call hold time distributions, wherein the feedback controller is an integral controller. FIG. 10(a) is the graph of the workload, FIG. 10(b) is the graph of the throughput and actual heap utilization, and FIG. 10(c) is the graph of the proportional control gain $K_p$ and integral control gain $K_i$. As shown in FIG. 10(a), the workload is selected as the workload from 65600 seconds to 95600 seconds in FIG. 8(a). It can be seen from FIG. 10(b) that the actual heap utilization and throughput of the application server can be converged relatively fast with certain oscillation, which indicates that the feedback controller can also track the changes in workload relatively well and make corresponding adjustments.

Figure 11:
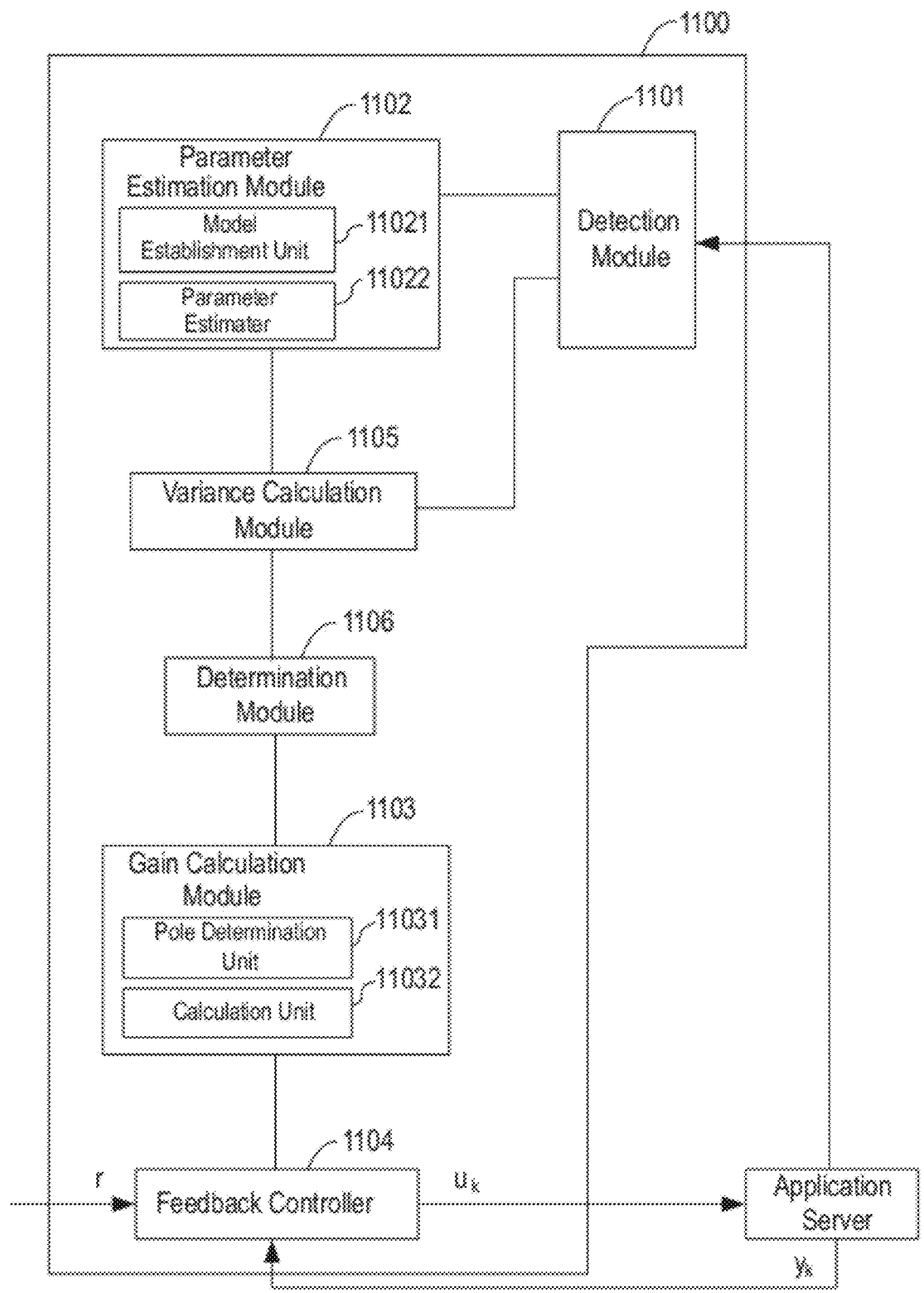
FIG. 11 is a schematic block diagram of an apparatus for controlling load admission rate of an application server according to one embodiment of the present invention.

Under the same inventive concept, FIG. 11 is a schematic block diagram of an apparatus 1100 for controlling load admission rate of an application server according to one embodiment of the present invention, in which the description for the same part as the above embodiments is properly omitted. Next, the embodiment will be described in detail in conjunction with the figure.

The apparatus 1100 for controlling load admission rate of an application server according to this embodiment includes: a detection module 1101, which detects the actual heap utilization and load admission rate of the application server in current control cycle; a parameter estimation module 1102, which estimates load characteristics variation parameters of the application server based on the actual heap utilization and the load admission rate detected by the detection module 1101; a gain calculation module 1103, which calculates control gain of a feedback controller 1104 based on the estimated load characteristics variation parameters; and the feedback controller 1104, which calculates desired load admission rate of the application server in next control cycle by using the control gain calculated by the gain calculation module 1103.

In this embodiment, the detection module 1101 detects the actual heap utilization and load admission rate of the application server in current control cycle at the end of each global garbage collection, and provides them to the parameter estimation module 1102 to estimate the load characteristics variation parameters. In the parameter estimation module 1102, a model establishment unit 11021 establishes a heap utilization model for the application server. The established heap utilization model associates the actual heap utilization with the load admission rate, and its parameters are taken as the load characteristics variation parameters. As mentioned above, the heap utilization model can be a first-order ARMA model or a second-order or higher order model. Then, a parameter estimator 11022 estimates the parameters of the heap utilization model by using the heap utilization model and the detected actual heap utilization and load admission rate. As mentioned above, the parameter estimator 11022 can perform parameter estimation by using the linear fitting method such as Kalman filtering method, and least square method.

The load characteristics variation parameters obtained by the parameter estimation module 1102 are provided to the gain calculation module 1103 to calculate the control gain of the feedback controller 1104.

In this embodiment, the feedback controller 1104 is a proportional plus integral controller, and its input-output relationship is $u_k=u_{k-1}+(K_p+K_i)*e_k-K_p*e_{k-1}$, wherein k represents the control cycle, $e_k=r-y_k$, r represents the target heap utilization, $y_k$ represents the actual heap utilization in the $k^{th}$ control cycle, $u_k$ represents the desired load admission rate in the $k^{th}$ control cycle, $u_{k-1}$ represents the load admission rate in the $k-1^{th}$ control cycle, $K_p$ represents the proportional control gain, and $K_i$ represents the integral control gain. The load admission rate of the application server can be regulated by the feedback controller 1104.

In the gain calculation module 1103, the proportional control gain $K_p$ and the integral control gain $K_i$ are determined by means of the pole placement method. First, a pole determination unit 11031 determines the pole positions that reflect the desired control performance, based on the desired control performance such as settling time and maximum overshoot. Then, a calculation unit 11032 calculates the control gain of the feedback controller 1104 based on the determined pole positions and the load characteristics variation parameters obtained in the parameter estimation module 1102.

As mentioned above, the feedback controller 1104 may also be a proportional controller, or an integral controller, or a proportional plus integral plus derivative controller.

It should be noted that the apparatus 1100 for controlling load admission rate of an application server of this embodiment can operationally realize the method for controlling load admission rate of an application server by using a feedback controller as shown in FIG. 3.

Further, in order to avoid degradation of the control performance due to the parameter drift, the apparatus 1100 for controlling load admission rate of an application server of this embodiment may further include: a variance calculation module 1105, which calculates variance of the load admission rates and/or the actual heap utilization within a given number of control cycles; and a determination module 1106, which determines whether the calculated variance of the load admission rate and/or the calculated variance of the actual heap utilization exceeds a predetermined threshold. When either of the variance of the load admission rate and the variance of the actual heap utilization exceeds the predetermined threshold, the gain calculation module 1103 calculates the control gain of the feedback controller 1104 based on the load characteristics variation parameters. When neither the variance of the load admission rate nor the variance of the actual heap utilization exceeds the predetermined threshold, the gain calculation module 1103 does not calculate and the feedback controller 1104 maintains the current control gain.

It should be noted that the variance calculation module 1105 and the determination module 1106 are not necessary in this embodiment.

In addition, an application server control system is also provided, which includes: at least one application server; and at least one apparatus for controlling load admission rate of an application server as shown in FIG. 11, for controlling the load admission rate of the respective application servers.

The above mentioned method of the present invention can be implemented in software, hardware or combination of the software and hardware. The hardware part can be implemented in specific logics. For example, the apparatus for controlling load admission rate of an application server in the above embodiments and its various components can be implemented by hardware circuits such as Very Large Scale Integrated Circuit or gate array, semiconductors such as logic chips or transistors, or programmable hardware devices such as field programmable gate array, programmable logic device, or by software executed on various types of processors, or by the combination of the above hardware circuit and software. The software part can be stored in a memory and be executed by a proper instruction execution system such as microprocessor, personal computer (PC) or mainframe.

Although a method and apparatus for controlling load admission rate of an application server of the present invention has been described in detail in conjunction with the exemplary embodiments, these embodiments are not exhaustive, and a person skilled in the art can vary, replace or modify the embodiments without departing from the spirit and scope of the invention. Therefore, the present invention is not limited to these embodiments, the scope of which is only defined by appended claims.

What is claimed is:

1. A method for controlling load admission rate of an application server, comprising the steps of:
   detecting actual heap utilization and load admission rate of the application server in a current control cycle;
   estimating load characteristics variation parameters of the application server based on the detected actual heap utilization and load admission rate;
   calculating control gain of a feedback controller based on the load characteristics variation parameters; and
   calculating, by the feedback controller, desired load admission rate of the application server in a next control cycle with the calculated control gain;
   wherein the steps are carried out by a computer device.

2. The method according to claim 1, wherein estimating load characteristics variation parameters of the application server based on the detected actual heap utilization and load admission rate comprises the steps of:
   establishing a heap utilization model for the application server, which associates the actual heap utilization with the load admission rate and the parameters of which are taken as the load characteristics variation parameters; and
   estimating the parameters of the heap utilization model based on the detected actual heap utilization and load admission rate.

3. The method according to claim 2, wherein establishing a heap utilization model for the application server comprises the step of: establishing the heap utilization model as $y_k=a*y_{k-1}+b*u_{k-1}$, wherein k represents the control cycle, $y_k$ and $y_{k-1}$ represent the actual heap utilization in the $k^{th}$ and $k-1^{th}$ control cycles respectively, $u_{k-1}$ represents the load admission rate in the $k-1^{th}$ control cycle, and a and b represent the load characteristics variation parameters.

4. The method according to claim 2, wherein estimating load characteristics variation parameters uses a linear fitting method.

5. The method according to claim 4, wherein the linear fitting method is Kalman filtering method.

6. The method according to claim 1, wherein the feedback controller is a proportional controller.

7. The method according to claim 6, wherein calculating, by the feedback controller, the desired load admission rate of the application server in the next control cycle by using the calculated control gain comprises the step of: calculating the desired load admission rate by using $u_k=u_{k-1}+K_p*(e_k-e_{k-1})$, wherein k represents the control cycle, $e_k=r-y_k$, r represents target heap utilization, $y_k$ represents the actual heap utilization in the $k^{th}$ control cycle, $u_k$ represents the desired load admission rate in the $k^{th}$ control cycle, $u_{k-1}$ represents the load admission rate in the $k-1^{th}$ control cycle, and $K_p$ represents a proportional control gain.

8. The method according to claim 1, wherein the feedback controller is a proportional plus integral controller.

9. The method according to claim 8, wherein calculating, by the feedback controller, the desired load admission rate of the application server in the next control cycle by using the calculated control gain comprises: calculating the desired load admission rate by using $u_k=u_{k-1}+(K_p+K_i)*e_k-K_p*e_{k-1}$, wherein k represents the control cycle, $e_k=r-y_k$, r represents target heap utilization, $y_k$ represents the actual heap utilization in the $k^{th}$ control cycle, $u_k$ represents the desired load admission rate in the $k^{th}$ control cycle, $u_{k-1}$ represents the load admission rate in the $k-1^{th}$ control cycle, $K_p$ represents a proportional control gain, and $K_i$ represents an integral control gain.

10. The method according to claim 1, wherein the feedback controller is an integral controller.

11. The method according to claim 10, wherein calculating, by the feedback controller, the desired load admission rate of the application server in the next control cycle by using the calculated control gain comprises the step of: calculating the desired load admission rate by using $u_k=u_{k-1}+K_i*e_k$, wherein k represents the control cycle, $e_k=r-y_k$, r represents target heap utilization, $y_k$ represents the actual heap utilization in the $k^{th}$ control cycle, $u_k$ represents the desired load admission rate in the $k^{th}$ control cycle, $u_{k-1}$ represents the load admission rate in the $k-1^{th}$ control cycle, and $K_i$ represents an integral control gain.

12. The method according to claim 1, wherein the feedback controller is a proportional plus integral plus derivative controller.

13. The method according to claim 12, wherein calculating, by the feedback controller, the desired load admission rate of the application server in the next control cycle by using the calculated control gain comprises the step of: calculating the desired load admission rate by using $u_k=u_{k-1}+(K_p+K_i+K_d)*e_k-(K_p+2K_d)e_{k-1}+K_d e_{k-2}$, wherein k represents the control cycle, $e_k=r-y_k$, r represents target heap utilization, $y_k$ represents the actual heap utilization in the $k^{th}$ control cycle, $u_k$ represents the desired load admission rate in the $k^{th}$ control cycle, $u_{k-1}$ represents the load admission rate in the $k-1^{th}$ control cycle, $K_p$ represents a proportional control gain, $K_i$ represents an integral control gain, and $K_d$ represents a derivative control gain.

14. The method according to claim 1, wherein in calculating the desired load admission rate of the application server in the $k^{th}$ control cycle, the feedback controller uses the detected load admission rate in the $k-1^{th}$ control cycle.

15. The method according to claim 1, wherein calculating the control gain employs a pole placement method comprising the steps of:
   determining pole positions based on settling time and maximum overshoot; and
   calculating the control gain based on the pole positions and the load characteristics variation parameters.

16. The method according to claim 1, further comprising the steps of: before calculating the control gain,
    calculating variance of workload characteristics within a given number of control cycles;
    determining whether the calculated variance of workload characteristics exceeds a predetermined threshold;
    calculating control gain when the calculated variance of workload characteristics exceeds the predetermined threshold; and
    maintaining the current control gain of the feedback controller, if the calculating variance of workload characteristics does not exceed the pre-determined threshold.

17. An apparatus for controlling load admission rate of an application server, comprising:
    a detection module that detects actual heap utilization and load admission rate of the application server in a current control cycle;
    a parameter estimation module that estimates load characteristics variation parameters of the application server based on the actual heap utilization and load admission rate detected by the detection module;
    a gain calculation module that calculates control gain of a feedback controller based on the load characteristics variation parameters; and
    the feedback controller that calculates desired load admission rate of the application server in a next control cycle with the control gain calculated by the gain calculation module.

18. The apparatus according to claim 17, wherein the parameter estimation module comprises:
    a model establishment unit that establishes a heap utilization model for the application server, which associates the actual heap utilization with the load admission rate and the parameters of which are taken as the load characteristics variation parameters; and
    a parameter estimator that estimates the parameters of the heap utilization model based on the detected actual heap utilization and load admission rate.

19. The apparatus according to claim 18, wherein the heap utilization model established by the model establishment unit is in the form of $y_k = a*y_{k-1} + b*u_{k-1}$, wherein k represents the control cycle, $y_k$ and $y_{k-1}$ represents the actual heap utilization in the $k^{th}$ and $k-1^{th}$ control cycles respectively, $u_{k-1}$ represents the load admission rate in the $k-1^{th}$ control cycle, and a and b represent the load characteristics variation parameters.

20. The apparatus according to claim 18, wherein the parameter estimator is an apparatus that uses a linear fitting method.

21. The apparatus according to claim 20, wherein the linear fitting method is a Kalman filtering method.

22. The apparatus according to claim 17, wherein the feedback controller is a proportional controller.

23. The apparatus according to claim 22, wherein the input-output relationship of the proportional controller is $u_k = u_{k-1} + K_p*(e_k - e_{k-1})$, wherein k represents the control cycle, $e_k = r - y_k$, r represents target heap utilization, $y_k$ represents the actual heap utilization in the $k^{th}$ control cycle, $u_k$ represents the desired load admission rate in the $k^{th}$ control cycle, $u_{k-1}$ represents the load admission rate in the $k-1^{th}$ control cycle, and $K_p$ represents a proportional control gain.

24. The apparatus according to claim 17, wherein the feedback controller is a proportional plus integral controller.

25. The apparatus according to claim 24, wherein the input-output relationship of the proportional plus integral controller is $u_k = u_{k-1} + (K_p + K_i)*e_k - K_p*e_{k-1}$, wherein k represents the control cycle, $e_k = r - y_k$, r represents target heap utilization, $y_k$ represents the actual heap utilization in the $k^{th}$ control cycle, $u_k$ represents the desired load admission rate in the $k^{th}$ control cycle, $u_{k-1}$ represents the load admission rate in the $k-1^{th}$ control cycle, $K_p$ represents a proportional control gain, and $K_i$ represents an integral control gain.

26. The apparatus according to claim 17, wherein the feedback controller is an integral controller.

27. The apparatus according to claim 26, wherein the input-output relationship of the integral controller is $u_k = u_{k-1} + K_i*e_k$, wherein k represents the control cycle, $e_k = r - y_k$, r represents target heap utilization, $y_k$ represents the actual heap utilization in the $k^{th}$ control cycle, $u_k$ represents the desired load admission rate in the $k^{th}$ control cycle, $u_{k-1}$ represents the load admission rate in the $k-1^{th}$ control cycle, and $K_i$ represents an integral control gain.

28. The apparatus according to claim 17, wherein the feedback controller is a proportional plus integral plus derivative controller.

29. The apparatus according to claim 28, wherein the input-output relationship of the proportional plus integral plus derivative controller is $u_k = u_{k-1}(K_p + K_i + K_d)*e_k - (K_p + 2K_d)e_{k-1} + K_d e_{k-2}$, wherein k represents the control cycle, $e_k = r - y_k$, r represents target heap utilization, $y_k$ represents the actual heap utilization in the $k^{th}$ control cycle, $u_k$ represents the desired load admission rate in the $k^{th}$ control cycle, $u_{k-1}$ represents the load admission rate in the $k-1^{th}$ control cycle, $K_p$ represents a proportional control gain, $K_i$ represents an integral control gain, and $K_d$ represents a derivative control gain.

30. The apparatus according to claim 17, wherein when calculating the desired load admission rate in the $k^{th}$ control cycle, the feedback controller uses the detected load admission rate in the $k-1^{th}$ control cycle.

31. The apparatus according to claim 17, wherein the gain calculation module comprises:
    a pole determination unit that determines pole positions based on settling time and maximum overshoot; and
    a calculation unit that calculates the control gain based on the pole positions and the load characteristics variation parameters.

32. The apparatus according to claim 17, further comprising:
    a variance calculation module that calculates variance of workload characteristics within a given number of control cycles; and
    a determination module that determines whether the calculated variance of workload characteristics exceeds a predetermined threshold;
    wherein when the calculated variance of workload characteristics exceeds the predetermined threshold, the gain calculation module calculates the control gain of the feedback controller and when the calculated variance of workload characteristics does not exceed the predetermined threshold, the current control gain of the feedback controller is maintained.

33. An application server control system, comprising:
    at least one application server; and
    at least one apparatus for controlling load admission rate of an application server according to claim 17 for controlling the load admission rate of the respective application servers.

* * * * *